United States Patent [19]

Cooper

[11] 4,231,156
[45] Nov. 4, 1980

[54] GUIDE LINE HOLDER
[75] Inventor: Izates C. Cooper, El Cajon, Calif.
[73] Assignee: Lawrence F. Myers, El Cajon, Calif.
[21] Appl. No.: 41,906
[22] Filed: May 24, 1979
[51] Int. Cl.³ ............................................. G01C 15/00
[52] U.S. Cl. ..................... 33/1 LE; 33/339; 33/412; 24/261 R
[58] Field of Search ................. 33/339, 412, 413, 404, 33/1 LE; 248/295 R, 296, 302, 303; 24/81 CR, 261 R, 73 C; 403/397; 256/48, 57

[56] References Cited
U.S. PATENT DOCUMENTS

| 1,336,004 | 4/1920 | Victoria | 33/404 |
|---|---|---|---|
| 3,250,009 | 5/1966 | Oseka | 33/404 |
| 3,348,312 | 10/1967 | Jones | 33/404 |
| 3,763,567 | 10/1973 | Hudis | 33/1 LE |
| 3,883,934 | 5/1975 | Rochfort | 24/261 R |
| 3,932,049 | 1/1976 | Hirato | 24/81 CR |

Primary Examiner—William D. Martin, Jr.
Attorney, Agent, or Firm—Knox & Knox

[57] ABSTRACT

A tool for holding lines such as are used in guiding paving machines, in earth moving and leveling, and the like, comprising a stake, ordinarily a length of cylindrical metal rod or tubular stock with a ground penetrating point, a line holder of similar, lighter stock and having an offset or angulated end portion to which the line is connected, and a unique clamp for mounting the line holder on the stake with multi-mode adjustment capability.

6 Claims, 6 Drawing Figures

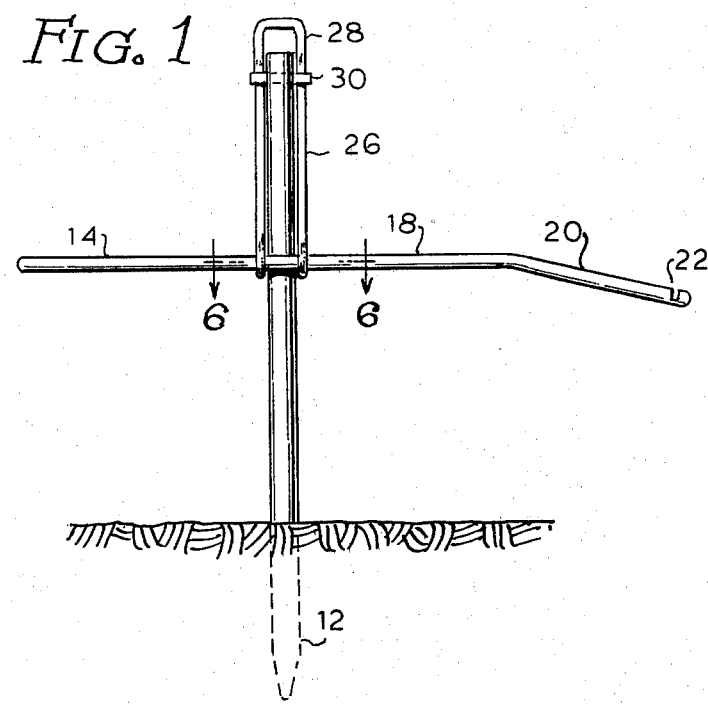
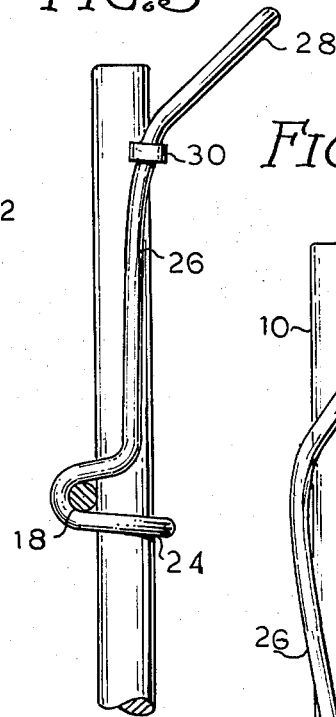
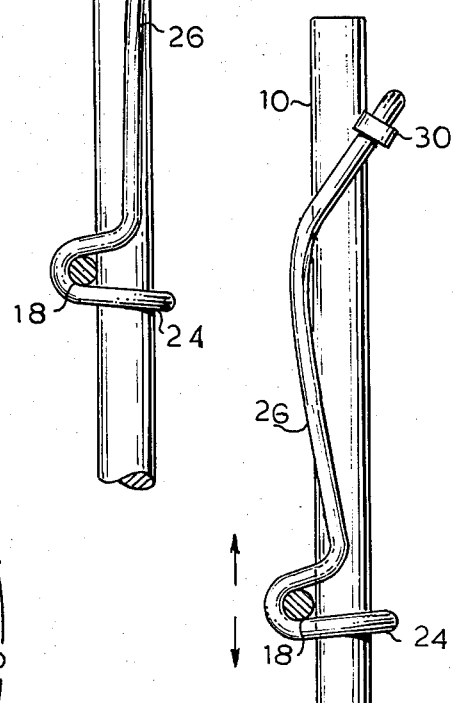
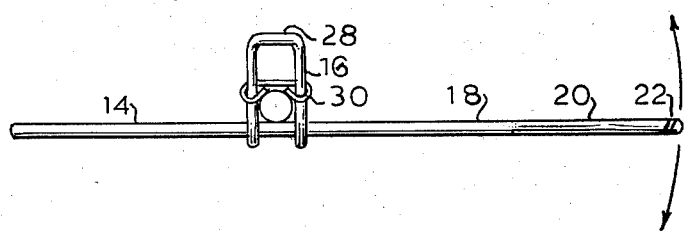
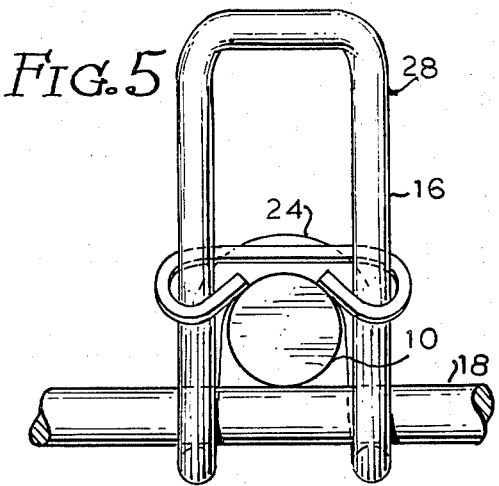
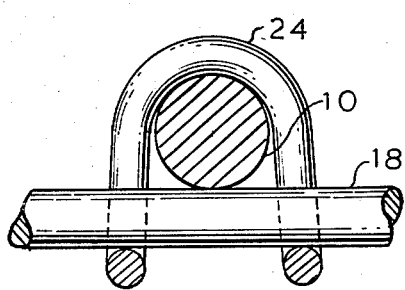

GUIDE LINE HOLDER

BACKGROUND OF THE INVENTION

The well established practice of preliminary laying out of engineering projects requiring reasonably accurate directional and vertical or depth indication in relation to the existing earth surface need hardly be recounted here, but the common procedure of driving stakes into the ground and simply tying lines directly onto the stakes, then sliding the same up and down and tilting the stakes for more accurate adjustment is conducive to error and frustrating. Certain improved methods have been proposed, the best possibly being that disclosed in U.S. Pat. No. 2,149,360 to Prout wherein the holder comprises a compound staff consisting of a handle with parallel metal bars spaced apart to accept a pivotally mounted level with a line holding hook at one end, there being no provision for adjustment other than by shifting the pivot point up or down on the metal bars, but the collapsibility of the device being noteworthy. Certain other devices, primarily for leveling ground for irrigation, have been developed with varying success. There is a need, therefore, for a line holding tool of simple, economical construction which combines multimode adjustment functionality in use in the mentioned field, which is safe and easy to use, and which facilitates fine adjustment after preliminary setting of the stakes.

SUMMARY OF THE DISCLOSURE

As disclosed and claimed, the instant invention represents an adequate response to the immediately above-mentioned need comprising in brief a simple ground stake, a line holder extending generally horizontally and adjustable vertically as well as radially of the stake in both angular and transverse directions, and rotationally about its longitudinal axis for fine adjustment, complimented by a clamp of novel design which brackets the line holder and straddles the stake and is manipulable to bind the line holder on the side of said stake while permitting controlled, that is, partial or complete release of the line holder in making adjustments.

BRIEF DESCRIPTION OF THE DRAWING

FIG. 1 is a front elevational view of the line holding tool, the stake being indicated as having been driven into the ground, and the line holder bar being shown clamped to the front side of the stake;

FIG. 2 is a top plan view of the tool as disposed in FIG. 1;

FIG. 3 is an enlarged side view of the means for mounting the line holder bar on the stake, the latter being shown fragmentarily, and the slider being shown as disposed when the line holder bar is in clamped position and held tightly against the stake;

FIG. 4 is a view similar to FIG. 3 and showing the slider raised and the clamp tilted to release the line holding bar;

FIG. 5 is an enlarged view similar to FIG. 2 but showing the stake in section and the line holding bar fragmentarily; and FIG. 6 is a detail view of the portion of the clamp embracing the stake partly in section and with the line holding bar shown fragmentarily.

DETAILED DESCRIPTION OF A PREFERRED EMBODIMENT

Referring now to the drawing, wherein like numerals refer to like or identical parts and portions throughout the several views, the tool comprises a stake 10 which will ordinarily be recticylindrical and constructed of metal rod or tubular stock and provided with a sharpened point 12 to facilitate its being driven into the ground. A line holder bar 14 is adjustably supported on the stake 10 and clamp means 16 for mounting the line holder bar 14 on the stake 10.

The line holder bar is a metal rod with a rectilinear portion 18 and an angularly disposed or offset portion 20 provided with a notch or hook terminal 22 to facilitate the attachment thereto of a line, not illustrated, such as is used to guide paving and earth moving machines and the like. Clamp means 16, possibly best illustrated in FIG. 3, includes a unitary element formed from metal bar stock with a u-shaped portion 24 embracing the stake 10, and twin arm portions thereof extending more or less horizontally beneath the bar 14. The arm portions are returned over the top of said bar 14 and have lever arm portions 26 continued upwardly on each side of the stake 10, and terminating in a handle portion 28. This handle portion is illustrated as an inverted u-shaped structure formed by simply joining the upper ends of the lever arm portions, and the handle portion 28 is bent in a direction away from the portion 18 of the bar 14 so that manipulation of the handle toward the stake 10 will allow the clamp element as a whole to pivot about the point of contact of the u-shaped portion 24 to release the bar from the stake for adjustment of the bar, as indicated in FIG. 4. To permit such release, the slider 30 is manually pushed upwardly on the lever arm portions and usually onto the handle portion as indicated in this FIG. 4.

After adjustment of the line holder 18, the handle portion 28 is used to pivot the clamp into the position shown in FIG. 3, with the line holder bar 18 forced into tight frictional contact with the stake 10, and the slider 30 falls by gravity or is manually shifted downwardly to lock the lever arm portions in place.

The slider as shown comprises a cross bar with terminal loops slidably embracing the lever arm portions 26 and engaging a side of the stake 10 in locking position as shown in FIG. 3.

The method of making and using this invention will be obvious, it being noted that the disclosed clamp means permits adjustment of the line holder bar 14 vertically of the stake 10, lengthwise of the bar 24 or transversely of the stake 10, and for very temporary use, rotationally of the stake without the stake itself being rotated. In addition, fine adjustment of the line is easily accomplished by merely rotating the line holder bar 14 about the axis of the portion 18 thereof since the offset portion 20 is thereby adjusted vertically and horizontally. In regard to this last mentioned feature, it may be noted that the clamping action need only be reduced sufficiently to allow rotation of the bar without disturbing a previous vertical setting of the u-shaped portion 24.

What I claim as new and desire to secure by Letters Patent is:

1. A guide line support tool for lines used to guide paving operations and the like, said line support tool comprising:

(a) a ground stake (b) a line holder comprising an elongated bar having means for direct attachment of a line thereto;

(c) clamp means for mounting said line holder on said stake so as to be adjustable in three modes, longitudinally of the stake, transversely of of the stake by movement of the holder longitudinally of itself, and rotationally of the stake, said clamp means frictionally binding said bar against a side of said stake when adjusted in all said three modes.

2. Apparatus according to claim 1 wherein said bar comprises a rectilinear portion releasibly engaged by said clamp means and an offset portion having means to connect a line thereto so that a 360° fine adjustment of the line can be achieved by rotational adjustment of said rectilinear portion about the longitudinal axis thereof.

3. Apparatus according to claim 1 wherein said clamp means comprises a u-shaped portion embracing said post with twin arm portions extending beneath said bar and returned over the top of said bar and then continued as lever means releasibly manipulable to force said bar into tight frictionally gripping position on said stake, and means to lock said lever means holding said bar in said position.

4. Apparatus according to claim 3 wherein said lever means has a terminal handle portion extending away from said stake for easy access.

5. Apparatus according to claim 3 wherein said means to lock comprises a slider on said lever means capable of being wedged between said stake and said lever means in locked position.

6. Apparatus according to claim 5 wherein said handle portion comprises extended (26) portions of said twin arm portions (claim 4) connected together, and said slider is a cross bar with terminal loops slidably embracing said extended portions.

* * * * *